United States Patent
Elluru et al.

(10) Patent No.: US 11,423,014 B2
(45) Date of Patent: Aug. 23, 2022

(54) METHOD AND SYSTEM FOR DATABASE ENHANCEMENT IN A SWITCH

(71) Applicant: Hewlett Packard Enterprise Development LP, Houston, TX (US)

(72) Inventors: Krishna Mohan Elluru, Bangalore (IN); Madhusoodhana Chari Sesha, Bangalore (IN); Esteban Rodriguez Betancourt, San Jose (CR); Rangaprasad Sampath, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 378 days.

(21) Appl. No.: 16/551,354

(22) Filed: Aug. 26, 2019

(65) Prior Publication Data
US 2021/0064600 A1 Mar. 4, 2021

(51) Int. Cl.
G06F 16/23 (2019.01)
H04L 12/46 (2006.01)
G06F 16/21 (2019.01)
G06F 16/22 (2019.01)

(52) U.S. Cl.
CPC ........ *G06F 16/2379* (2019.01); *G06F 16/212* (2019.01); *G06F 16/2282* (2019.01); *H04L 12/4641* (2013.01)

(58) Field of Classification Search
CPC ............. G06F 16/2379; G06F 16/2282; G06F 16/212; H04L 12/4641
See application file for complete search history.

(56) References Cited

U.S. PATENT DOCUMENTS

2005/0271044 A1* 12/2005 Hsu ................... H04L 12/40026
370/360
2015/0100560 A1* 4/2015 Davie ..................... G06F 9/455
707/703
2016/0366070 A1* 12/2016 Yeung ................. H04L 41/0856
(Continued)

OTHER PUBLICATIONS

Ixia, "Measuring Network Convergence Time", White Paper, Rev. C, Jan. 2014, pp. 1-18.
(Continued)

*Primary Examiner* — Kris E Mackes
(74) *Attorney, Agent, or Firm* — Park, Vaughan, Fleming & Dowler LLP (57) ABSTRACT

One embodiment of the present invention provides a switch. The switch includes a storage device, a processing module, and a database module. The storage device can maintain a database storing configuration information for the switch. During operation, the processing module produces a piece of data associated with operations of the switch based on the configuration information. The database module then stores the piece of data in a database table of the database without caching the piece of data in a memory of the switch after the piece of data is stored in the database. In this way, the database module can reduce the memory occupancy of the processing module in comparison with the storage occupancy of a schema corresponding to the database table. Subsequently, the processing module can program a hardware module of the switch with the piece of data prior to receiving an acknowledgment from the database module.

20 Claims, 9 Drawing Sheets

(56) References Cited

U.S. PATENT DOCUMENTS

2018/0203895 A1* 7/2018 Dong ............... G06F 16/24532

OTHER PUBLICATIONS

Michael Kerrisk, "Open vSwitch IDL (Interface Definition Language) compiler", available online at <https://web.archive.org/web/20180718080949/http://man7.org/linux/man-pages/man1/ovsdb-idlc.1.html>, Apr. 30, 2018, 3 pages.

MySQL Tutorial, "MySQL Insert on Duplicate Key Update", available online at <https://web.archive.org/web/20180531182636/https://www.mysqltutorial.org/basic-mysql-tutorial-aspx/mysql-insert-or-update-on-duplicate-key-update/>, May 31, 2018, 8 pages.

Oracle©, "13.2.6.2 Insert . . . On Duplicate Key Update Syntax", available online at <https://web.archive.org/web/20190708074602/https://dev.mysql.com/doc/refman/8.0/en/insert-on-duplicate.html>, version 8.0, Jul. 8, 2009, 3 pages.

Pfaff et al., "The Open vSwitch Database Management Protocol", RFC 7047, Dec. 2013, pp. 1-35.

Tom Black, "ArubaOS-CX: A Modern, Programmable Network for the Mobile and IoT Age", available online at <https://blogs.arubanetworks.com/solutions/arubaos-cx-a-modern-programmable-network-for-the-mobile-and-iot-age/>, Aug. 14, 2017, 7 pages.

* cited by examiner

METHOD AND SYSTEM FOR DATABASE ENHANCEMENT IN A SWITCH

BACKGROUND

Field

The present disclosure relates to communication networks. More specifically, the present disclosure relates to a method and system for efficiently deploying a database in a switch for storing and retrieving data.

BRIEF DESCRIPTION OF THE FIGURES

In the figures, like reference numerals refer to the same figure elements.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

Internet is the delivery medium for a variety of applications running on physical and virtual devices. Such applications have brought with them an increasing demand for bandwidth. As a result, equipment vendors race to build larger and faster switches with versatile capabilities. Consequently, a switch continues to store more configuration information as the switch participates in virtualizations, partitions, and switch groups, and operates on a plurality of network protocols of different network layers. This configuration needs to be applied to the switch when the switch powers up, and thus, should be persistent. The switch reads the information during booting up (i.e., powering up), and loads the information into memory. Managing persistent storage using limited resources of a switch can be challenging.

To facilitate efficient usage of persistent storage, the switch can be equipped with a database. However, since the switch may have limited resources (e.g., limited memory and processing capability), the database running on the switch should be a lightweight database. However, many typical database solutions are burdened with a significant number of performance challenges. For example, a specific module of the switch may need to retrieve redundant and/or irrelevant pieces of data from the database and maintain that piece of data in the memory of the switch. Furthermore, the modules of the switch may need to wait for unnecessary notifications from the database manager before using a piece of data. This can increase operations on the central processor of the switch and may cause a delay in executing certain operations. As a result, the switch may incur convergence delay, which can impact the performance of the switch in a network.

While a database brings many desirable features to a switch, some issues remain unsolved regarding incorporating a database in a switch.

One embodiment of the present invention provides a switch. The switch includes a storage device, a processing module, and a database controller module. The storage device can maintain a database storing configuration information for the switch. During operation, the processing module produces a piece of data associated with operations of the switch based on the configuration information. The database controller module then stores the piece of data in a database table of the database without caching the piece of data in a memory of the switch after the piece of data is stored in the database. In this way, the database controller module can reduce the memory occupancy of the processing module in comparison with the storage occupancy of a schema corresponding to the database table. Subsequently, the processing module can program a hardware module of the switch with the piece of data prior to receiving an acknowledgment from the database controller module.

In a variation on this embodiment, the database controller module determines whether a row associated with the piece of data exists in the database table. If the row exists in the database table, the database controller module updates the row with the piece of data. If the row does not exist in the database table, the database controller module inserts the piece of data in the database table.

In a variation on this embodiment, the processing module may refrain from subscribing for the piece of data. Furthermore, the database controller module may refrain from sending the acknowledgment for the piece of data.

In a variation on this embodiment, the switch can also include a subscriber module, which can obtain a second piece of data from the database and execute an operation based on a subset of the second piece of data. The subscriber module then buffers the subset of the second piece of data in the memory of the switch without buffering rest of the second piece of data.

In a further variation, the subscriber module can program the hardware module of the switch with the subset of the second piece of data.

In a variation on this embodiment, the processing module executes a daemon process.

In a variation on this embodiment, producing the piece of data comprises one or more of: learning a media access control (MAC) address, learning a virtual local area network (VLAN) identifier, and computing a new route for the switch. The piece of data can then include the MAC address, the VLAN identifier, and the route, respectively.

In a variation on this embodiment, the database controller module can operate based on Open vSwitch Database (OVSDB) protocol.

The embodiments described herein solve the problem of efficiently deploying a database in a switch by simplifying the storage and retrieval process of data files, thereby facilitating an enhanced database system in the switch. The enhanced database system can reduce computational overhead by efficiently transferring data between the database and the switch modules.

Within existing database architecture, such as an Open vSwitch Database (OVSDB) architecture, upon receiving a piece of data from the database, a switch module (e.g., a hardware module or a software daemon) needs to buffer the data in the memory. However, the module often uses only a portion of the data or a modified version of the data. Furthermore, after programming the underlying hardware, the module doesn't need to buffer the data any longer. As a result, the limited memory of the switch is unnecessarily occupied by the buffering. This can impose a limit on the scale of the switch. For example, if a layer-3 daemon needs the information of a specific route, that daemon may need to download all routes of the switch stored in the database and store the downloaded routes in the memory of the switch for caching. As a result, the memory of the switch can be occupied by pieces of data that are not used by the daemon.

Furthermore, if a switch module produces a piece of data (e.g., a layer-2 daemon learns a new media access control (MAC) address), the module provides the data to the database. Until the database acknowledges a successful insertion, the module needs to store the data in a buffer and cannot use that data. As a result, the module may wait for an insertion cycle (e.g., a processor cycle) to use the data. If the data is large, the limited memory of the switch can be ill-utilized due to the buffering and the convergence can be significantly delayed. Moreover, the database manager may use computing resources (e.g., processor cycles) for providing the acknowledgments. Consequently, the operations associated with the database can inefficiently utilize the memory and computing resources of the switch.

To solve this problem, the switch can be equipped with an enhanced database system that facilitates efficient data management for the database and the module. The enhanced database system can include a database manager that executes database operations on a database, which can include one or more database tables. If the module needs a piece of data, the module can subscribe to the database system for notifications indicating any changes to the data. During operation, the module can obtain the data from the database system and determine a subset of data needed by the module.

For example, upon receiving the routes computed for the switch, the module may determine a subset of routes needed by the module. The module can then configure the hardware of the switch based on the subset of data without buffering the data received from the database system. If the piece of data is updated, the module can re-obtain the data from the database system. In this way, the module may only maintain and use the subset of data, and increase the efficiency of the buffering process. This selective buffering can reduce memory usage and the number of processor cycles.

Moreover, the database system can be configured to allow insertion of the data produced by a module at any time. During operation, if a module produces a piece of data, the module can provide the piece of data to the database system. If a corresponding row exists in the database, the database system can update the existing row with the new piece of data. Otherwise, the database system can insert a new row comprising the piece of data into the database. Since the database is enhanced to insert the piece of data in the database whenever the module provides the piece of data, the module can avoid buffering the piece of data while waiting for the database to complete an insertion cycle, thereby freeing up the memory. Furthermore, the module can immediately use that data without waiting for an acknowledgment from the database and hence can help the switch to converge quickly.

In this disclosure, the term "switch" is used in a generic sense, and it can refer to any standalone or fabric switch operating in any network layer. "Switch" should not be interpreted as limiting embodiments of the present invention to layer-2 networks. Any device that can forward traffic to an external device or another switch can be referred to as a "switch." Any physical or virtual device (e.g., a virtual machine/switch operating on a computing device) that can forward traffic to an end device can be referred to as a "switch." Examples of a "switch" include, but are not limited to, a layer-2 switch, a layer-3 router, a routing switch, or a fabric switch comprising a plurality of similar or heterogeneous smaller physical and/or virtual switches.

The term "packet" refers to a group of bits that can be transported together across a network. "Packet" should not be interpreted as limiting embodiments of the present invention to layer-3 networks. "Packet" can be replaced by other terminologies referring to a group of bits, such as "message," "frame," "cell," or "datagram."

Switch and Network Architecture

Figure 1:
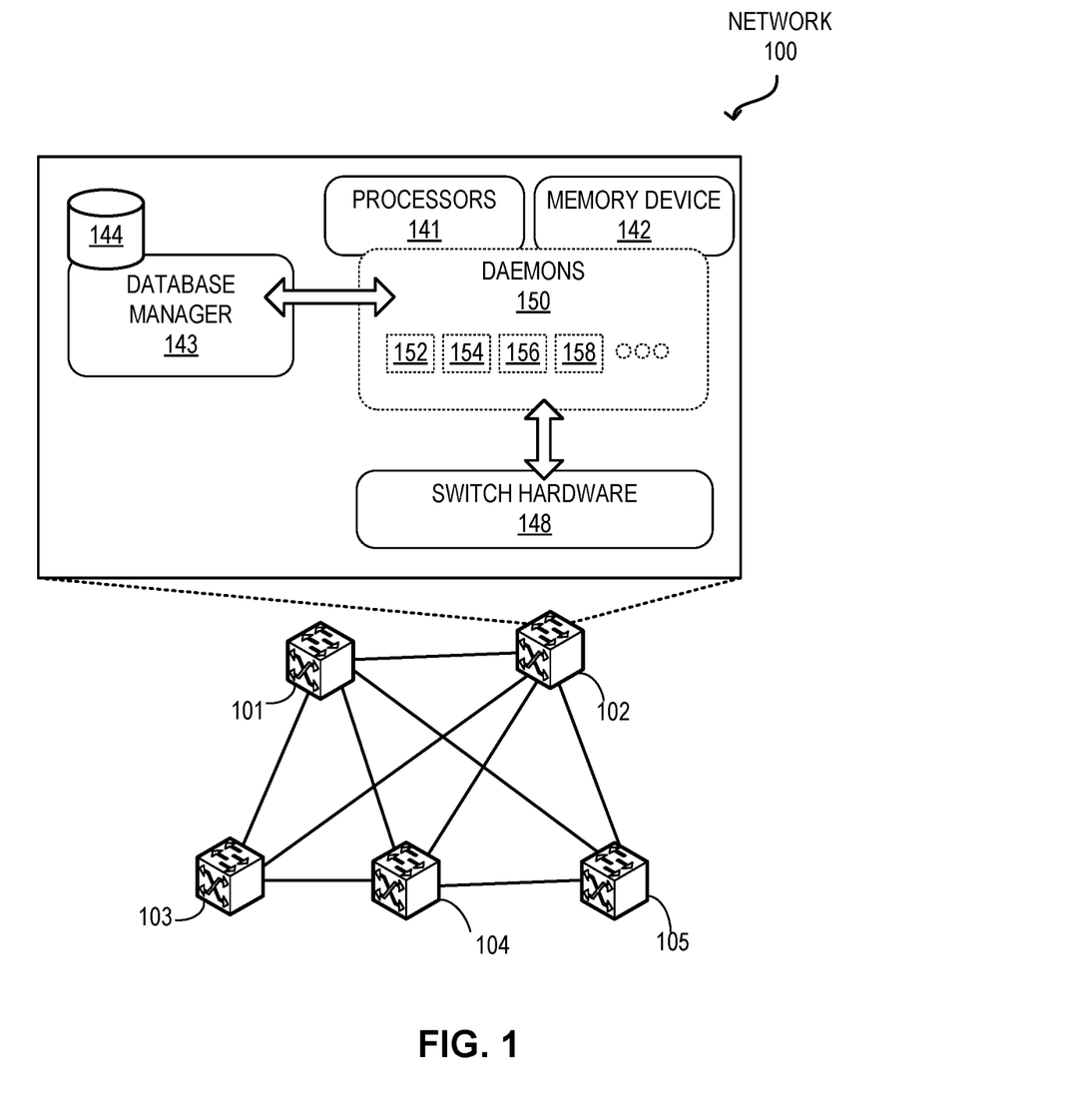
FIG. 1 illustrates an exemplary network with enhanced database system support, in accordance with an embodiment of the present application.

FIG. 1 illustrates an exemplary network with enhanced database system support, in accordance with an embodiment of the present application. As illustrated in FIG. 1, a network 100 includes switches 101, 102, 103, 104, and 105. In some embodiments, network 100 is an Ethernet network and a respective switch of network 100, such as switch 102, is a layer-2 switch. Under such a scenario, communication among the switches in network 100 is based on Ethernet protocol. In some further embodiments, network 100 is an IP network and a respective switch of network 100, such as switch 102, is an IP router, which calculates and maintains a local IP routing table (e.g., a routing information base or RIB), and is capable of forwarding packets based on its IP addresses. Under such a scenario, communication among the switches in network 100 is based on IP.

A respective switch in network 100, such as switch 102, is equipped with one or more processors 141 and a memory device 142. Switch 102 can execute a database manager 143, which can maintain a database 144. In some embodiments, database manager 143 can be an OVSDB server and database 144 can be a database based on the OVSDB protocol. Switch 102 can store information needed to operate switch 102 in database 144. Switch 102 can participate in various services and operations, such as network virtualization (e.g., a virtual local area networks (VLAN)), switch partitioning, and link aggregations (e.g., a multi-chassis trunk).

Switch 102 can also operate on a plurality of network protocols of different network layers (e.g., Ethernet and IP). Switch 102 can run a number of daemons 150, which can include daemons 152, 154, 156, and 158, for supporting these operations and protocols. Furthermore, switch 102 can include switch hardware 148, which can include forwarding hardware (e.g., content-addressable memory (CAM)), switching fabric, and interfaces.

With existing technologies, upon receiving a piece of data from the database, a daemon, such as daemon 152, needs to buffer the piece of data in memory device 142. However, daemon 152 often uses only a portion of the piece of data or a modified version of the piece of data. Furthermore, after programming underlying hardware 148, daemon 152 doesn't need to buffer the piece of data any longer. As a result, the limited capacity of memory device 142 is unnecessarily occupied by the buffering. This can impose a limit on the scale of switch 102. For example, if daemon 152 is a layer-3 daemon and needs the information of a specific route, daemon 152 may need to download all routes of switch 102 stored in database 144 and store the downloaded routes in memory device 142 for caching. As a result, memory device 142 can be occupied by pieces of data that are not used by daemon 152.

Furthermore, if daemon 154 is a producer daemon that produces a piece of data (e.g., daemon 154 can be a layer-2 daemon that learns a new MAC address), daemon 154 provides that piece of data to database manager 143. Until database manager 143 acknowledges a successful insertion into database 144, daemon 154 typically stores the piece of data in a buffer in memory device 142 and cannot use the piece of data. As a result, daemon 154 may wait for an insertion cycle to use the piece of data. If the piece of data is large, the limited capacity of memory device 142 can be ill-utilized due to the buffering. Moreover, due to the delay in the utilization of the piece of data, the convergence of switch 102 can be significantly delayed. In addition, database manager 143 may use computing resources (e.g., processor cycles of processors 141) for providing the acknowledgments. Consequently, the operations associated with database 143 can inefficiently utilize the resources of switch 102.

To solve this problem, switch 102 can facilitate efficient data management for database manager 143 and daemons 150. During operation, if daemon 152 requires a piece of data, daemon 152 can obtain the data from database manager 143. Daemon 152 can then determine a subset of the data needed by daemon 152 and may discard the rest of the data. Daemon 152 is also allowed to configure hardware 148 with the subset of data without buffering the data obtained from database manager 143 in its entirety. Daemon 152 can subscribe to database manager 143 for notification indicating any changes to the piece of data. As a result, daemon 152 can re-obtain the data from database manager 143 if needed. Since daemon 152 can obtain the updated data from database manager 143, daemon 152 does not need to buffer the piece of data in memory device 142. This can reduce the memory usage and the number of processing cycles.

Furthermore, database manager 143 can be enhanced to allow insertion of a piece of data produced by daemon 154 at any time. In other words, database manager 143 can be configured to insert the data into database 144 regardless of whether a corresponding row exists in a database table in database 144. If the row exists, database manager 143 can update the existing row of the database table in database 144 with the new piece of data. Otherwise, database manager 143 can create a row comprising the new piece of data in the database table in database 144. In this way, daemon 154 can avoid buffering the piece of data while waiting for database manager 143 to complete an insertion cycle, thereby freeing up memory device 142. Moreover, daemon 154 can immediately use the data without waiting for an acknowledgment from database manager 143. For example, upon producing the piece of data, daemon 154 can program hardware 148 based on the data without receiving an acknowledgment from database manager 143. Daemon 154, thus, can help switch 102 to converge quickly by programming hardware 148 without waiting for the acknowledgment.

Database Enhancements

Figure 2:
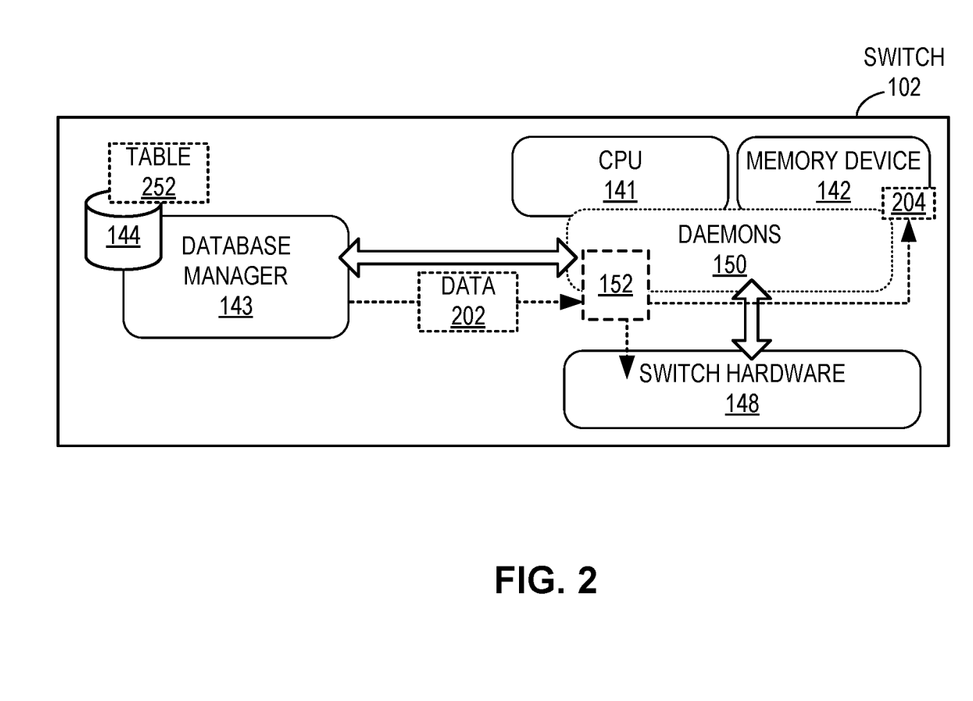
FIG. 2 illustrates an exemplary data retrieval from an enhanced database system in a switch, in accordance with an embodiment of the present application.

FIG. 2 illustrates an exemplary data retrieval from an enhanced database system in a switch, in accordance with an embodiment of the present application. During operation, database manager 143 can maintain a piece of data 202 in a database table 252 in database 144. Daemon 152 can subscribe to database manager 143 for data 202. Upon detecting the presence (or modification) of data 202 in table 252 in database 144, database manager 143 can provide data 202 to daemon 152 based on the subscription. Since daemon 152 may not need data 202 in its entirety, daemon 152 can retrieve data 204, which can be a portion or a subset of data 202. For example, if data 202 includes the routes calculated by switch 102, data 204 can be a specific route used by daemon 152.

For subsequent processing, daemon 152 may buffer data 204 in memory device 142. Since data 204 can be significantly smaller in volume than data 202, allowing daemon 152 to select a subset of data 202 and buffering only the subset can improve the memory utilization of daemon 152. Consequently, the memory occupancy of daemon 152 is reduced in comparison with the storage occupancy of a schema corresponding to table 252 storing data 202. In this way, daemon 152 can maintain an efficient buffering process.

In some embodiments, daemon 152 may not buffer data 204 since database manager 143 can provide data 204 upon detecting a change. Daemon 152 can be configured to determine whether to buffer data 204. Upon retrieving data 204 from data 202, daemon 152 can discard the rest of data 202. Daemon 152 can then configure hardware 148 of switch 102 based on data 204. Subsequently, if data 202 is updated, daemon 152 can re-obtain data 202 from database manager 143 based on the subscription. In this way, daemon 152 can reduce the memory usage for daemon 152.

Figure 3A:
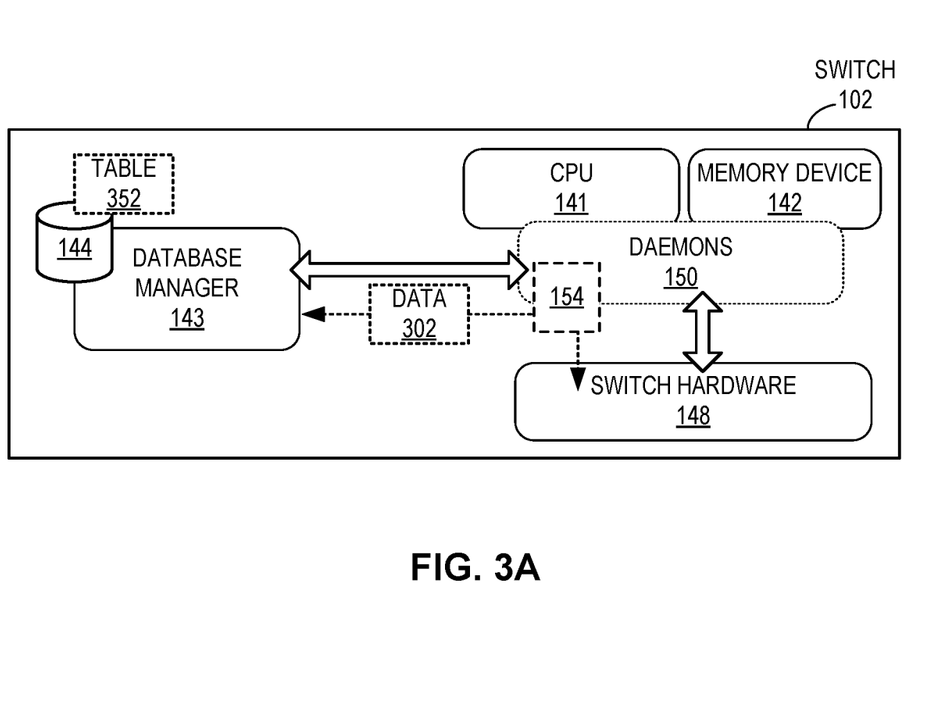
FIG. 3A illustrates an exemplary data storage in an enhanced database system in a switch, in accordance with an embodiment of the present application.

FIG. 3A illustrates an exemplary data storage in an enhanced database in a switch, in accordance with an embodiment of the present application. To facilitate the enhanced insertion operation, database manager 143 can be configured to always insert a piece of data received from daemon 154. During operation, if daemon 154 produces a piece of data 302, daemon 154 can provide data 302 to database manager 143. Examples of producing data 302 include, but are not limited to, learning a new MAC address and/or a virtual local area network (VLAN) identifier, and computing a new route for the switch. If a corresponding row exists in a table 352 in database 144, database manager 143 can update the existing row of table 352 in database 144 with data 302.

For example, if daemon 154 is a layer-2 daemon and re-learns a MAC address in association with a new VLAN, daemon 154 can provide the MAC address and VLAN pair information to database manager 143. Upon receiving the information, database manager 143 can determine that the VLAN information for the MAC address already exists in a database table 352 in database 144. Database manager 143 then updates the corresponding row in table 352 with the information of the new VLAN. On the other hand, if the corresponding information does not exist in database 144, database manager 143 can insert a new row comprising data 302 into table 352 in database 144.

Here, database manager 143 is enhanced to insert data 302 in database 144 whenever daemon 154 provides data 302. In other words, database manager 143 always stores the data produced by daemon 154 even if a corresponding piece of data exists in database 144. As a result, daemon 154 can avoid buffering data 302 while waiting for database manager 143 to complete an insertion cycle, thereby freeing up memory device 142. Consequently, the memory occupancy of daemon 154 is reduced in comparison with the storage occupancy of a schema corresponding to table 352. Furthermore, daemon 154 can immediately use data 302 without waiting for an acknowledgment from database manager 143 and hence can help switch 102 to converge quickly. For example, if data 302 is a new MAC address learned by daemon 154, daemon 154 can program the new MAC address in hardware 148 without waiting for an acknowledgment from database manager 143.

Typically, a database does not insert a piece of data into a database table if a corresponding row is found (e.g., a duplication is detected). Consequently, a producer daemon buffers the data, waits for an acknowledgment from the database, and configures switch hardware only if the database issues a positive acknowledgment. As a result, the memory of the switch remains occupied by the piece of data and the hardware configuration may wait for an insertion cycle. The insert operation of database manager 143 solves this problem by inserting data 302 into table 352 even if the corresponding row is detected. This allows daemon 154 to configure hardware 148 without waiting for an acknowledgment from database manager 143.

Figure 3B:
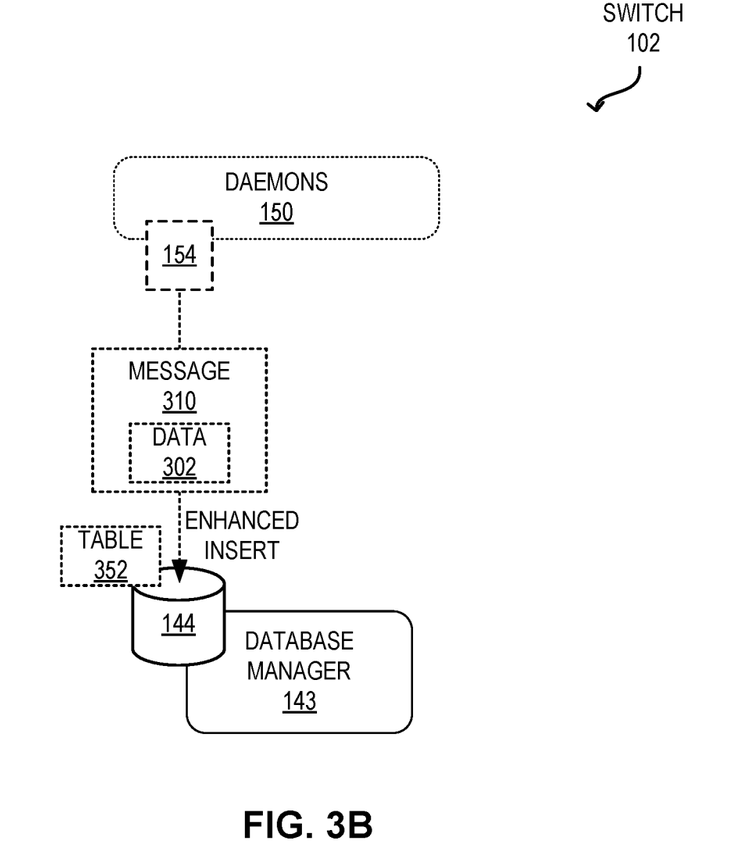
FIG. 3B illustrates an exemplary insertion operation of an enhanced database system in a switch, in accordance with an embodiment of the present application.

FIG. 3B illustrates an exemplary insertion operation of an enhanced database system in a switch, in accordance with an embodiment of the present application. To allow database manager 143 to store data 302 in database 144 even if a corresponding row exists in table 352 of database 144, database manager 143 can be equipped with an enhanced insert operation. In some embodiments, this enhanced insert operation can be based on an "up-set" operation, which can include both "update" and "insert" operations. The enhanced insert operation checks for the existence of data 302 in database 144 and executes an update operation upon detecting the existence of the row.

During operation, database manager 143 can receive a message 310 (e.g., a JavaScript Object Notation (JSON) message) from daemon 154. Message 310 can include data 302 and can indicate one or more keys associated with data 302. The keys for data 302 can be lookup keys, such as primary keys, that can be used to perform a lookup operation in database 144. Message 310 can also indicate that an enhanced insertion operation is needed for data 302. Based on the keys, database manager 143 determines whether a corresponding row exists in table 352 in database 144. If the row exists, database manager 143 updates the row with data 302. Otherwise, database manager 143 can insert data 302 in a new row in table 352 of database 144.

However, since daemon 154 is the producer of data 302, any update to data 302 would be generated by daemon 154. For example, if daemon 154 is a layer-2 daemon and data 302 is a newly learned MAC address, the re-learning of the MAC address would also be performed by daemon 154. As a result, daemon 154 may not subscribe for data 302 to database manager 143. Consequently, when database manager 143 performs the enhanced update operation on data 302, database manager 143 does not notify daemon 154. This can reduce processing overhead of database manager 143. However, other daemons of daemons 150 may subscribe to database manager 143 for data 302. Upon detecting a change to data 302 in table 352, database manager 143 can notify those daemons regarding the change.

Because database manager 143 inserts data 302 into database 144, daemon 154 does not buffer data 302 and associated metadata. Examples of the metadata include, but are not limited to, an identifier, such as a universally unique identifier (UUID), for data 302, a data structure for storing the identifier, and corresponding references (e.g., pointers). Consequently, daemon 154 does not need to perform any operation that might be needed without the enhanced insert operation. For example, daemon 154 does not need to update the buffer and/or the indices. As a result, daemon 154 improves the corresponding resource utilization (e.g., reduces the number processor cycles and the volume of memory occupancy). Furthermore, since daemon 154 does not subscribe for data 302, daemon 154 does not need to maintain an open socket for communicating with database manager 154, thereby freeing up the socket memory.

Operations

Figure 4A:
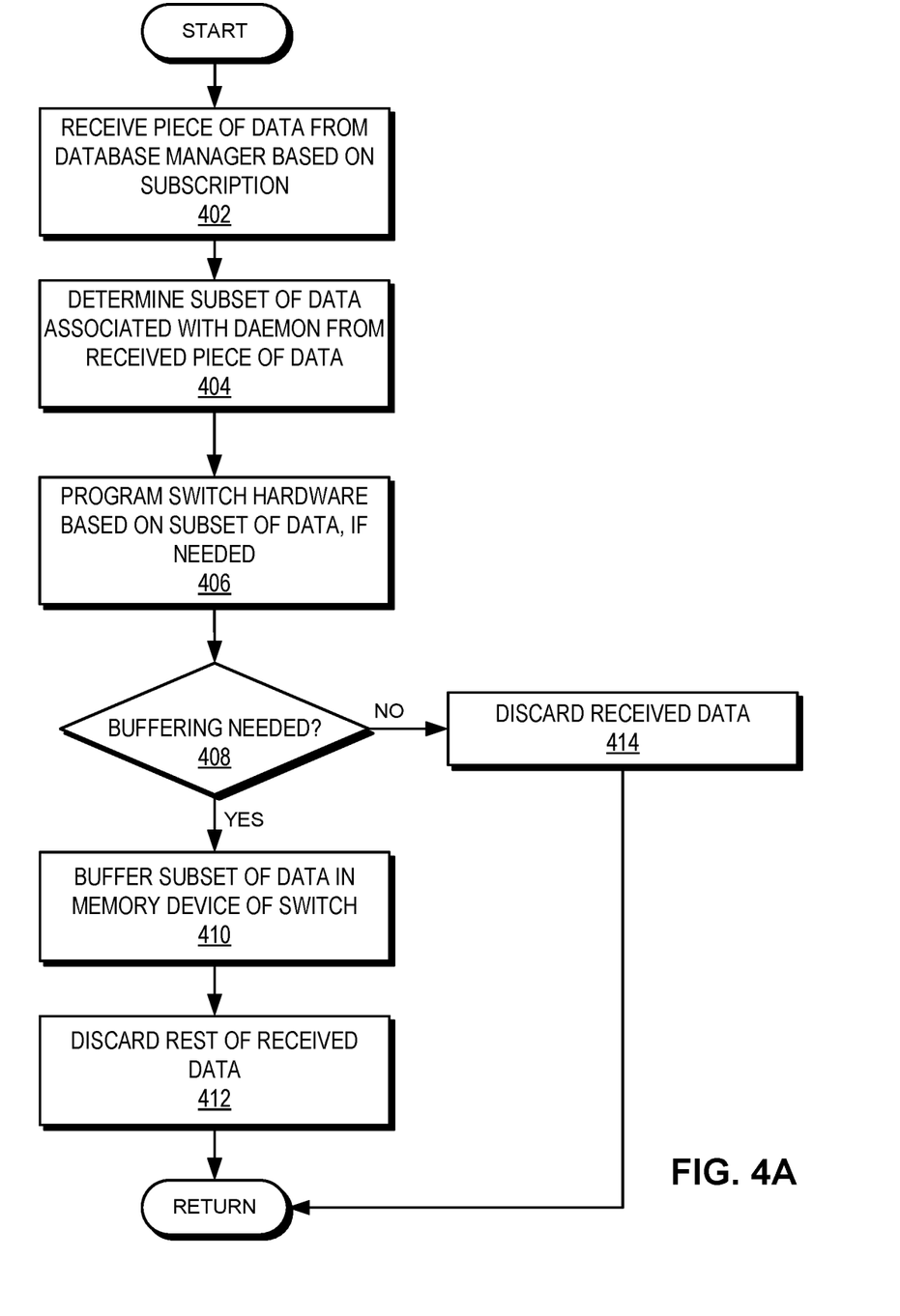
FIG. 4A presents a flowchart illustrating the process of a module of a switch obtaining a piece of data from an enhanced database system, in accordance with an embodiment of the present application.

FIG. 4A presents a flowchart illustrating the process of a module of a switch obtaining a piece of data from an enhanced database system, in accordance with an embodiment of the present application. During operation, the module receives a piece of data from the database manager based on a subscription for the data (operation 402). The module then determines a subset of the data associated with the daemon from the received piece of data (operation 404) and programs the switch hardware based on the subset of data, if needed (operation 406).

The module can check whether buffering is needed for the subset of data (operation 408). If buffering is needed for the subset of data, the module can buffer the subset of data in the memory device of the switch (operation 410) and discard the rest of the received data (operation 412). On the other hand, if buffering is not needed for the subset of data, the module can discard the received data (operation 414).

Figure 4B:
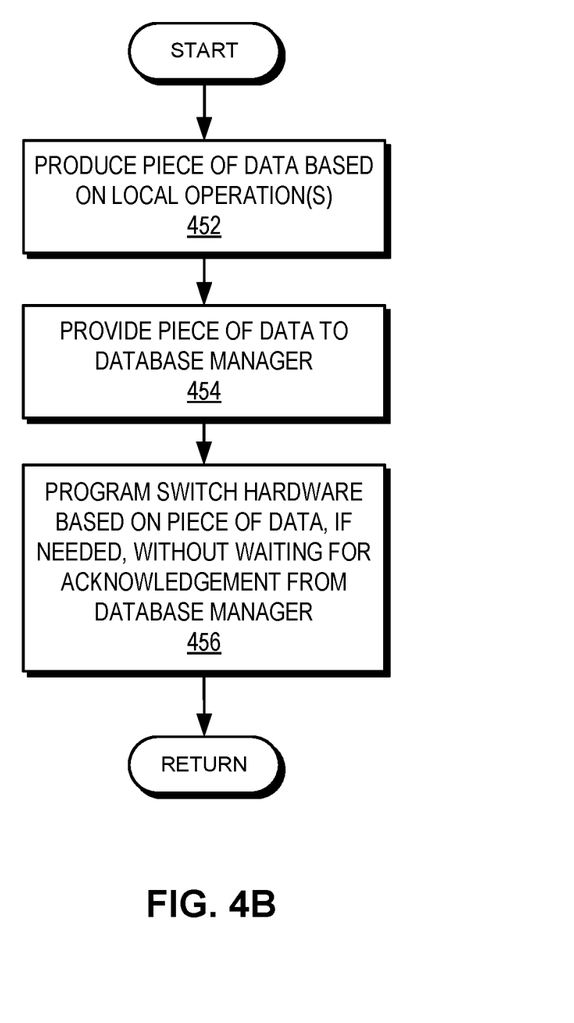
FIG. 4B presents a flowchart illustrating the process of a module of a switch storing a piece of data in an enhanced database system, in accordance with an embodiment of the present application.

FIG. 4B presents a flowchart illustrating the process of a module of a switch storing a piece of data in an enhanced database system, in accordance with an embodiment of the present application. During operation, the module produces a piece of data based on the local operation(s) (e.g., MAC address learning) (operation 452). The module then provides the piece of data to the database manager (operation 454) and programs the switch hardware based on the piece of data, if needed, without waiting for an acknowledgment from the database manager (operation 456).

Figure 5A:
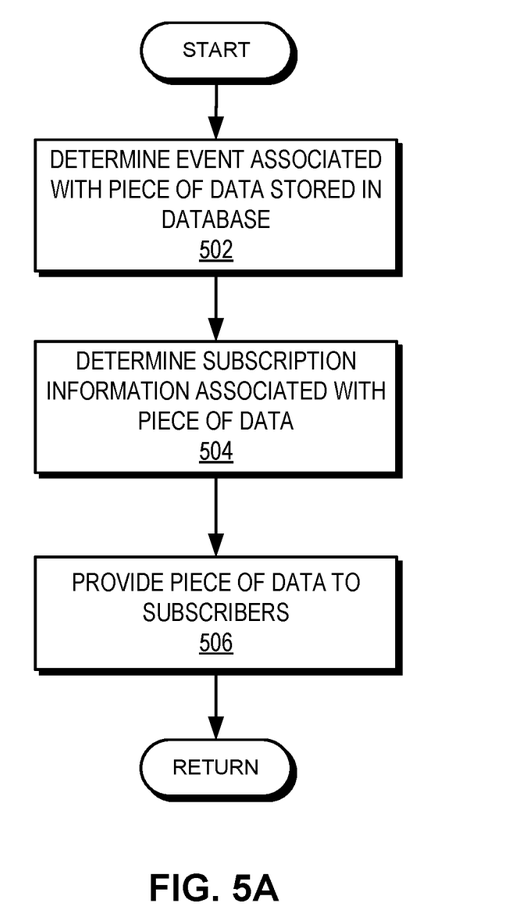
FIG. 5A presents a flowchart illustrating the process of an enhanced database system providing a piece of data to a module of a switch based on subscription, in accordance with an embodiment of the present application.

FIG. 5A presents a flowchart illustrating the process of an enhanced database system providing a piece of data to a module of a switch based on subscription, in accordance with an embodiment of the present application. During operation, the database manager of the database system determines an event associated with a piece of data in the database of the system (operation 502). Examples of the event include, but are not limited to, the insertion of a row comprising the piece of data and updates to a row comprising the piece of data. The database manager then determines the subscription information associated with the piece of data (operation 504) and provides the piece of data to the subscribers (operation 506). For example, a module can subscribe to the database manager for the learned MAC addresses. If the database manager detects a new MAC address learned by the switch or an update to a learned MAC address, the database manager can provide the MAC address to the module based on the subscription.

Figure 5B:
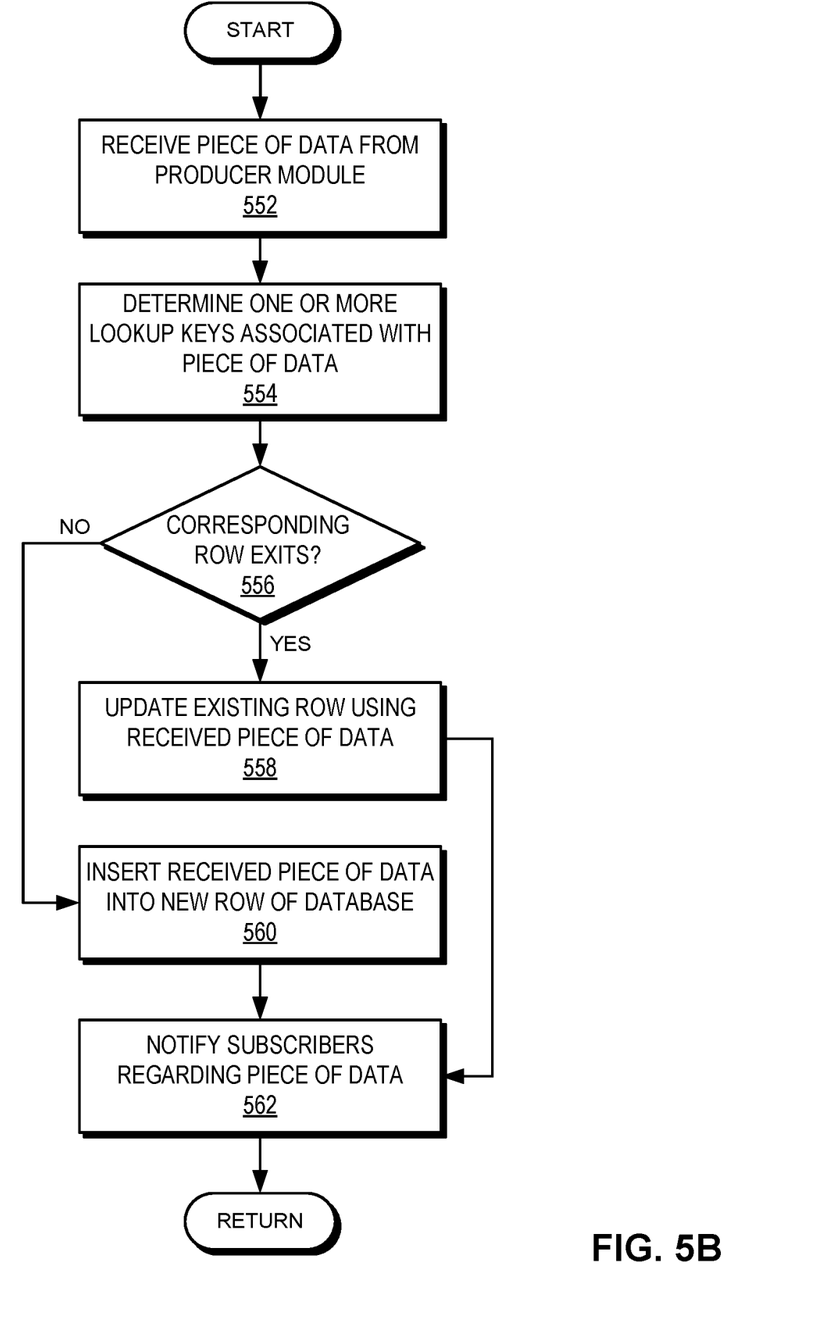
FIG. 5B presents a flowchart illustrating the process of an enhanced database system storing a piece of data obtained from a module of a switch, in accordance with an embodiment of the present application.

FIG. 5B presents a flowchart illustrating the process of an enhanced database system storing a piece of data obtained from a module of a switch, in accordance with an embodiment of the present application. During operation, the database manager of the database system receives a piece of data from a producer module (operation 552) and determines one or more lookup keys associated with the piece of data (operation 554). The database manager then determines whether a corresponding row exists in the database of the database system (operation 556).

If a corresponding row exists, the database manager updates the existing row with the received piece of data (operation 558). If a corresponding row does not exist, the database manager inserts the received piece of data into a new row of the table of the database (operation 560). The database manager then notifies the subscribers of the piece of data regarding the insertion or update of the piece of data (operation 562). It should be noted that the producer module may not subscribe to the database manager for the piece of data. Consequently, the database manager does not need to notify the producer module regarding the piece of data.

Exemplary Switch

Figure 6:
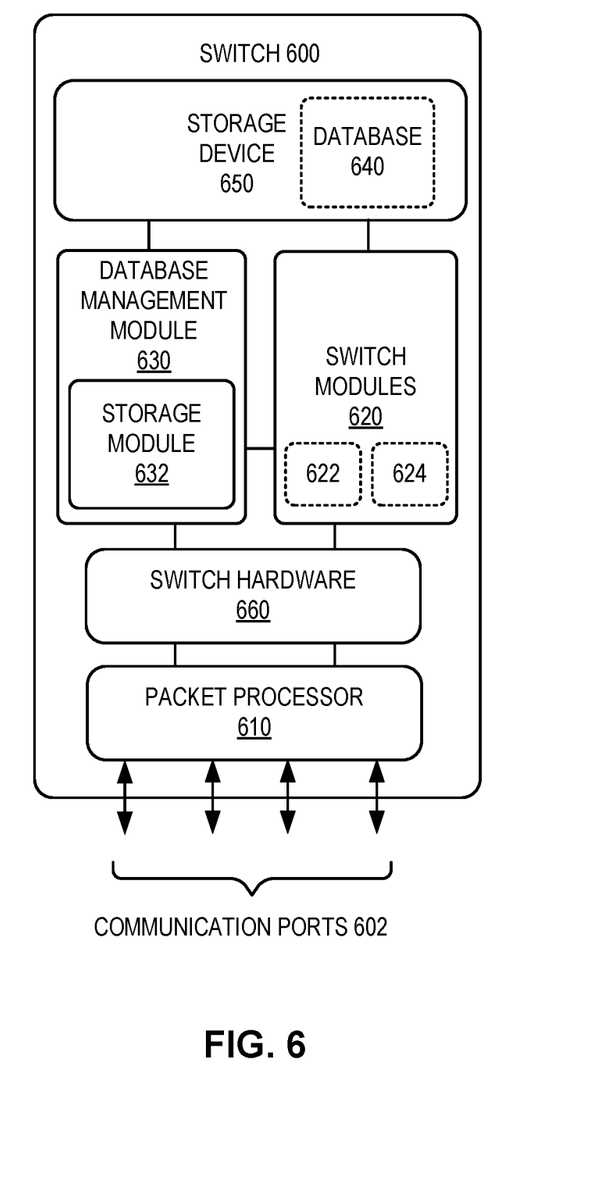
FIG. 6 illustrates an exemplary switch with an enhanced database system, in accordance with an embodiment of the present application.

FIG. 6 illustrates an exemplary switch with an enhanced database system, in accordance with an embodiment of the present application. In this example, a switch 600 includes a number of communication ports 602, a packet processor 610, a database management module 630, a set of switch modules 620 (e.g., hardware modules and/or software daemons), and a storage device 650. Switch 600 can also include switch hardware 660 (e.g., processing hardware of switch 600, such as its ASIC chips), which includes information based on which switch 600 processes packets (e.g., determines output ports for packets). Packet processor 610 extracts and processes header information from the received frames. Packet processor 610 can identify a switch identifier (e.g., a MAC address and/or an IP address) associated with the switch in the header of a packet.

Communication ports 602 can include inter-switch communication channels for communication with other switches and/or user devices. The communication channels can be implemented via a regular communication port and based on any open or proprietary format. Communication ports 602 can include one or more Ethernet ports capable of receiving frames encapsulated in an Ethernet header. Communication ports 602 can also include one or more IP ports capable of receiving IP packets. An IP port is capable of receiving an IP packet and can be configured with an IP address. Packet processor 610 can process Ethernet frames and/or IP packets.

During operation, database management module 630 can provide a piece of data from database 640 stored in storage device 650 to a module 622 of switch modules 620. Module 622 can determine a subset of data from the piece of data and program switch hardware 660 based on the subset of data. Module 622 may only buffer the subset of data and discard the rest of the piece of data. In some embodiments, module 622 may not buffer the piece of data and discard the piece of data in its entirety.

A module 624 of switch modules 620 can be a producer module that can produce a piece of data. Module 624 can provide the piece of data to database management module 630 and program switch hardware 660 based on the piece of data without waiting for an acknowledgment from database management module 630. Storage module 632 of database management module 630 can store the piece of data in database 640 based on an enhanced insertion operation.

Note that the above-mentioned modules can be implemented in hardware as well as in software. In one embodiment, these modules can be embodied in computer-executable instructions stored in a memory which is coupled to one or more processors in switch 600. When executed, these instructions cause the processor(s) to perform the aforementioned functions.

The methods and processes described herein can be embodied as code and/or data, which can be stored in a computer-readable non-transitory storage medium. When a computer system reads and executes the code and/or data stored on the computer-readable non-transitory storage medium, the computer system performs the methods and processes embodied as data structures and code and stored within the medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A switch, comprising:
   a non-transitory, computer-readable medium configured to maintain a database storing configuration information for the switch;
   a processor configured to execute instructions comprising:
      a processing module configured to produce a piece of data associated with operations of the switch based on the configuration information; and
      a database controller module configured to:
         store the piece of data in a database table of the database without caching the piece of data in a memory of the switch after the piece of data is stored in the database, thereby reducing memory occupancy of the processing module in comparison with storage occupancy of a schema corresponding to the database table;
      wherein the processing module is further configured to program a hardware module of the switch with the piece of data prior to receiving an acknowledgment from the database controller module.

2. The switch of claim 1, wherein the database controller module is further configured to:
   determine whether a row associated with the piece of data exists in the database table;
   in response to determining that the row exists in the database table, update the row with the piece of data;
   in response to determining that the row does not exist in the database table, insert the piece of data in the database table.

3. The switch of claim 1, wherein the processing module is further configured to refrain from subscribing for the piece of data; and
wherein the database controller module is further configured to refrain from sending the acknowledgment for the piece of data.

4. The switch of claim 1, further comprising a subscriber module configured to:
obtain a second piece of data from the database;
execute an operation based on a subset of the second piece of data; and
buffer the subset of the second piece of data in the memory of the switch without buffering rest of the second piece of data.

5. The switch of claim 4, wherein the subscriber module is further configured to program the hardware module of the switch with the subset of the second piece of data.

6. The switch of claim 1, wherein the processing module is configured to execute a daemon process.

7. The switch of claim 1, wherein producing the piece of data comprises one or more of:
learning a media access control (MAC) address, wherein the piece of data includes the MAC address;
learning a virtual local area network (VLAN) identifier, wherein the piece of data includes the VLAN identifier; and
computing a new route for the switch, wherein the piece of data includes the route.

8. The switch of claim 1, wherein the database controller module is configured to operate based on Open vSwitch Database (OVSDB) protocol.

9. A method, comprising:
maintaining, in a storage device of a switch, a database storing configuration information for the switch;
producing, by a module of the switch, a piece of data associated with operations of the switch based on the configuration information;
storing the piece of data in a database table of the database without caching the piece of data in a memory of the switch after the piece of data is stored in the database, thereby reducing memory occupancy of the module in comparison with storage occupancy of a schema corresponding to the database table; and
programming, by the module, a hardware module of the switch with the piece of data prior to receiving an acknowledgment from the database.

10. The method of claim 9, further comprising:
determining whether a row associated with the piece of data exists in the database table;
in response to determining that the row exists in the database table, updating the row with the piece of data;
in response to determining that the row does not exist in the database table, inserting the piece of data in the database table.

11. The method of claim 9, further comprising:
refraining, by the module, from subscribing for the piece of data, and
refraining, by the database, from sending the acknowledgment for the piece of data.

12. The method of claim 9, further comprising:
obtaining, by a second module of the switch, a second piece of data from the database;
executing an operation based on a subset of the second piece of data; and
buffering the subset of the second piece of data in the memory of the switch without buffering rest of the second piece of data.

13. The method of claim 12, further comprising programming the hardware module of the switch with the subset of the second piece of data.

14. The method of claim 9, wherein the module includes a daemon process.

15. The method of claim 9, wherein producing the piece of data comprises one or more of:
learning a media access control (MAC) address, wherein the piece of data includes the MAC address;
learning a virtual local area network (VLAN) identifier, wherein the piece of data includes the VLAN identifier; and
computing a new route for the switch, wherein the piece of data includes the route.

16. The method of claim 9, wherein the database is configured to operate based on Open vSwitch Database (OVSDB) protocol.

17. A computer system, comprising:
a storage device;
a processor;
a hardware module;
a non-transitory computer-readable storage medium storing instructions, which when executed by the processor causes the processor to perform a method, the method comprising:
maintaining, in the storage device, a database storing configuration information for the switch;
producing, by a module of the computer system, a piece of data associated with operations of the computer system based on the configuration information;
storing the piece of data in a database table of the database without caching the piece of data in a memory of the computer system after the piece of data is stored in the database, thereby reducing memory occupancy of the module in comparison with storage occupancy of a schema corresponding to the database table; and
programming, by the module, the hardware module with the piece of data prior to receiving an acknowledgment from the database.

18. The computer system of claim 17, wherein the method further comprises:
determining whether a row associated with the piece of data exists in the database table;
in response to determining that the row exists in the database table, updating the row with the piece of data;
in response to determining that the row does not exist in the database table, inserting the piece of data in the database table.

19. The computer system of claim 17, wherein the method further comprises:
refraining, by the module, from subscribing for the piece of data, and
refraining, by the database, from sending the acknowledgment for the piece of data.

20. The computer system of claim 17, wherein the method further comprises:
obtaining, by a second module of the computer system, a second piece of data from the database;
executing an operation based on a subset of the second piece of data; and
buffering the subset of the second piece of data in the memory of the computer system without buffering rest of the second piece of data.

* * * * *